(12) United States Patent
Lefebvre et al.

(10) Patent No.: US 9,683,690 B2
(45) Date of Patent: Jun. 20, 2017

(54) MOVEMENT-CONSTRAINING ASSEMBLY FOR FLUID-CONVEYING SYSTEM

(71) Applicant: PRATT & WHITNEY CANADA CORP., Longueuil (CA)

(72) Inventors: Guy Lefebvre, Saint-Bruno-de-Montarville (CA); Francois Doyon, Sainte-Julie (CA); Yves Martin, Sainte-Julie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 331 days.

(21) Appl. No.: 14/189,201

(22) Filed: Feb. 25, 2014

(65) Prior Publication Data
US 2015/0240976 A1    Aug. 27, 2015

(51) Int. Cl.
F16J 15/00    (2006.01)
F16L 25/06    (2006.01)
F16L 19/00    (2006.01)

(52) U.S. Cl.
CPC ............. *F16L 25/06* (2013.01); *F16L 19/005* (2013.01)

(58) Field of Classification Search
CPC ....... F16L 25/06; F16L 19/005; F16L 37/091; F16L 19/0231; F16B 21/18; F16B 41/005; F16B 23/0069; F16B 37/14; F16B 5/0208
See application file for complete search history.

(56) References Cited

U.S. PATENT DOCUMENTS

| | | | | |
|---|---|---|---|---|
| 4,911,406 A | | 3/1990 | Attwood | |
| 5,362,111 A | * | 11/1994 | Harbin | F16L 19/005 285/330 |
| 5,490,693 A | | 2/1996 | Fisher et al. | |
| 5,851,035 A | * | 12/1998 | Marc | F16L 19/005 285/86 |
| 6,077,010 A | * | 6/2000 | Reid | F16B 5/0208 411/107 |
| 2006/0228191 A1 | * | 10/2006 | Ward | F16B 23/0069 411/429 |

FOREIGN PATENT DOCUMENTS

WO    2006108724 A1    10/2006

* cited by examiner

*Primary Examiner* — Brian Mattei
(74) *Attorney, Agent, or Firm* — Norton Rose Fulbright Canada LLP

(57) ABSTRACT

A movement-constraining assembly for a fluid-conveying system comprises a fluid-conveying tube defining an inner passage for fluid to pass therethrough. The tube is adapted to be connected to components of the fluid-conveying system at opposed ends thereof. A blocking ring is mounted to the tube with complementary surfaces between the tube and the blocking ring to block rotation between the tube and the blocking ring, the blocking ring having a first joint portion. A base is adapted to be secured to a structure, and having a second joint portion operatively joined to the first joint portion of the blocking ring to form a joint blocking at least an axial rotational degree of freedom of the fluid-conveying tube and allowing at least one translational degree of freedom of the tube relative to the structure. A method for constraining movement of a fluid-conveying tube of a fluid conveying-system is also provided.

19 Claims, 5 Drawing Sheets

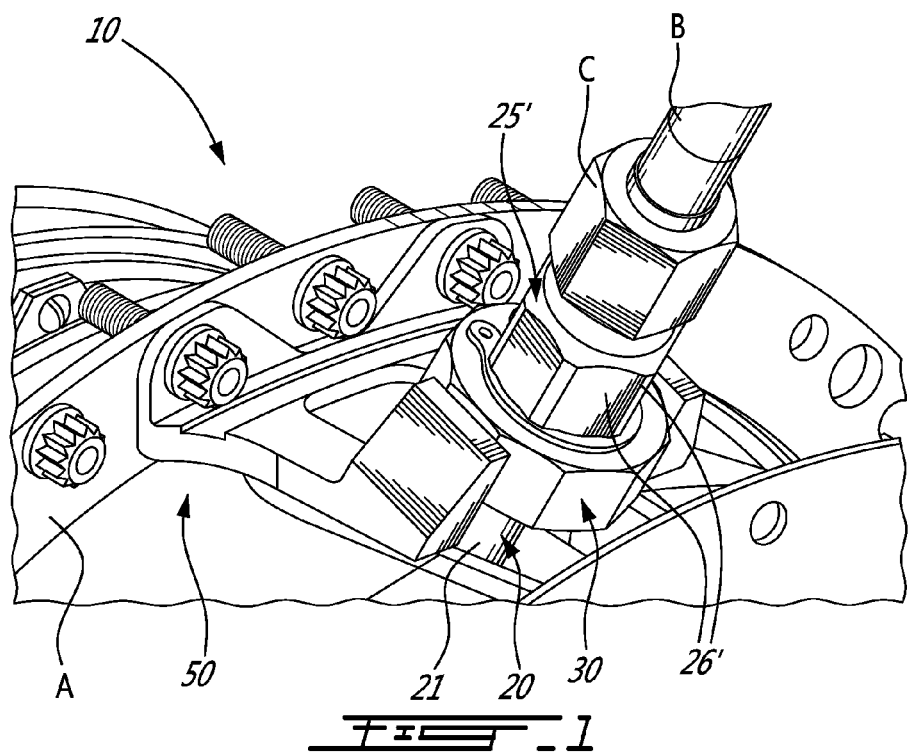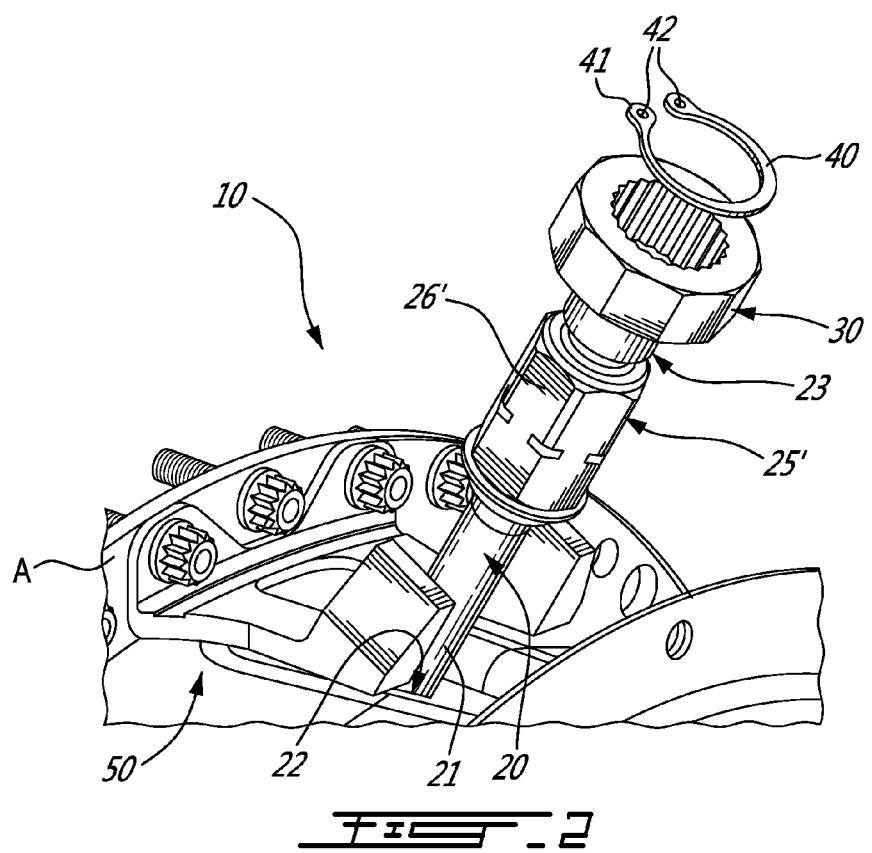

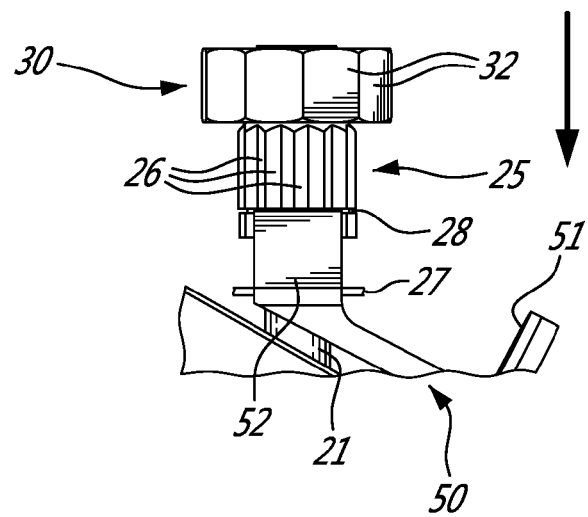
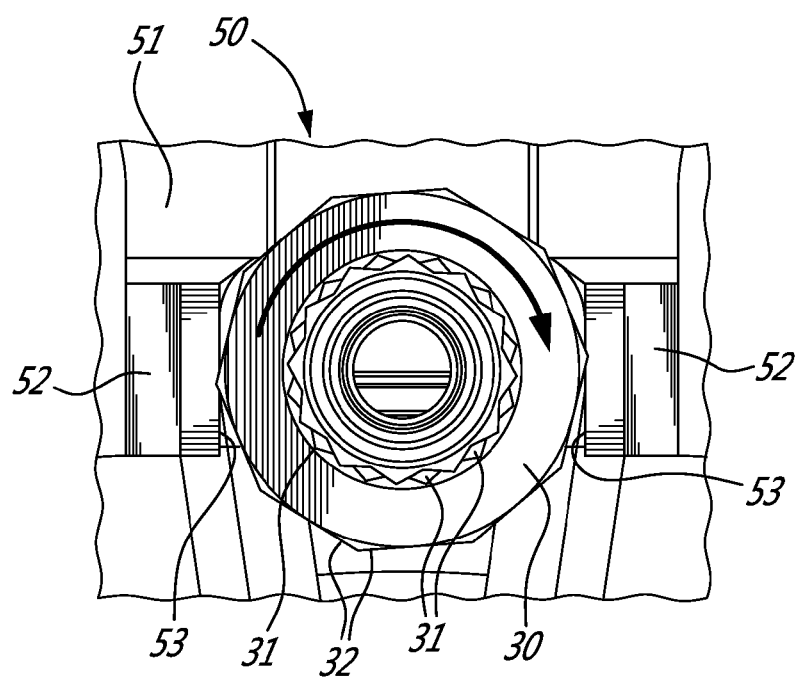

MOVEMENT-CONSTRAINING ASSEMBLY FOR FLUID-CONVEYING SYSTEM

TECHNICAL FIELD

The present disclosure relates to fluid-conveying systems and to movement-constraining assemblies therefor.

BACKGROUND OF THE ART

Tubes (a.k.a. tubing, piping, pipes, etc) are conventionally used in hydraulic or pneumatic circuits or similar applications to convey fluids between components. Depending on the applications, tubes may be subjected to rattling, vibrations, thermal variations, whereby tubes move relative to surrounding structures. One known application in which tubes may move is in aircraft. As an example, tubes may be coupled to one another or to components by threading engagement. If the tubes become unscrewed because of vibrations, rotations, etc, fluid leaks may result.

SUMMARY

In accordance with an embodiment of the present disclosure, there is provided a movement-constraining assembly for a fluid-conveying system, comprising: a fluid-conveying tube defining an inner passage for fluid to pass therethrough, the tube adapted to be connected to components of the fluid-conveying system at opposed ends thereof; a blocking ring mounted to the tube with complementary surfaces between the tube and the blocking ring to block rotation between the tube and the blocking ring, the blocking ring having a first joint portion; and a base adapted to be secured to a structure, and having a second joint portion operatively joined to the first joint portion of the blocking ring to form a joint blocking at least an axial rotational degree of freedom of the fluid-conveying tube and allowing at least one translational degree of freedom of the tube relative to the structure.

In accordance with another embodiment, there is provided a method for constraining movement of a fluid-conveying tube of a fluid conveying-system comprising: connecting the fluid-conveying tube at a first end to a component of a fluid-conveying system; securing a base having a joint portion to a structure adjacent to the fluid-conveying tube as connected to said component; installing a blocking ring on the fluid-conveying tube by engaging complementary surfaces therebetween to block rotation between the tube and the blocking ring, the blocking ring have a joint portion; and operatively joining the joint portions of the base and of the blocking ring to form a blocking at least an axial rotational degree of freedom of the fluid-conveying tube and allowing at least one translational degree of freedom of the tube relative to the structure.

DESCRIPTION OF THE DRAWINGS

FIG. 1 is an enlarged perspective view of a movement-constraining assembly for fluid-conveying system in accordance with the present disclosure;

FIG. 2 is an assembly view of the assembly of FIG. 1;

FIG. 5 is an elevation view showing a blocking ring being installed on the tube in the assembly of FIG. 1;

FIG. 6 is a plan view of the blocking ring of FIG. 5 being oriented to a proper orientation;

DETAILED DESCRIPTION

Figure 3:
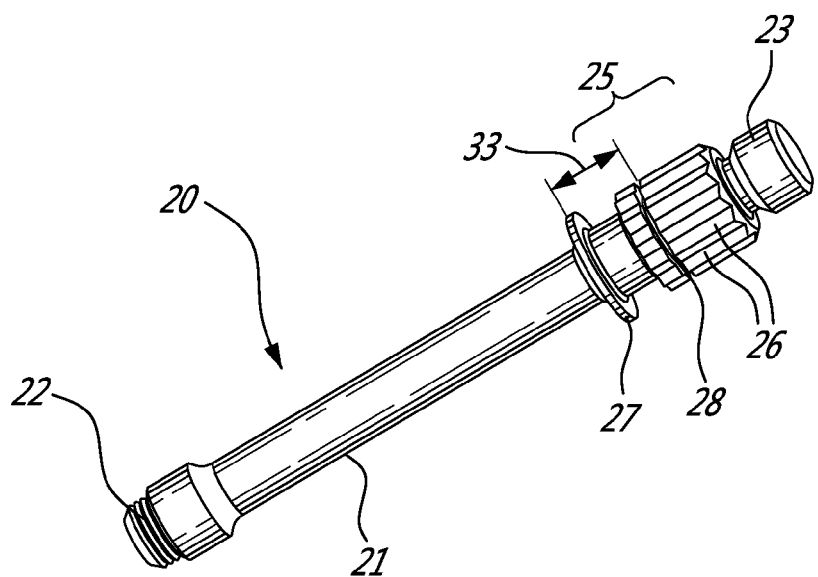
FIG. 3 is a perspective view of an exemplary embodiment of a tube of the assembly of FIG. 1.

Referring to the drawings and more particularly to FIGS. 1 and 2, a movement-constraining assembly for tubes of a fluid-conveying system is generally shown at 10. The movement-constraining assembly 10 comprises a tube 20, a blocking ring 30, a retaining ring 40 and a base 50.

The tube 20 is connected at opposed ends to components of a fluid-conveying system, such as other tubes or pipes of an hydraulic circuit, or equipment e.g., tank, injection system, etc. The tube 20 is also part of the fluid-conveying system as its inner passage serves for conveying fluids. In the illustrated embodiment, the tube 20 is in the vicinity of the casing A or like structural component, and is shown connected at one end to a tube B having a coupler C.

The blocking ring 30 is coupled to the tube 20 and will cooperate with the base 50 to form a joint constraining movement of the tube 20, for instance by forming an anti-rotation feature while imposing no axial nor radial constraints.

The retaining ring 40 may be part of the assembly 10 and is one contemplated solution to hold the blocking ring 30 captive on the tube 20.

The bracket 50 is the interface between the casing A or like structural component and the blocking ring 30. As an alternative to the casing A, the bracket 50 may be connected to any structural or stable component, for instance of a gas turbine engine when the assembly 10 is used in the context of a gas turbine engine. As an example, the casing A may be part of an oil tank, etc.

Referring to FIG. 3, the tube 20 is shown in greater detail. The tube 20 has an elongated tubular body 21 forming an inner passage for fluid flow therethrough. In an embodiment, the tube 20 is an oil tube that is part of an hydraulic system. The tube 20 is thus made of any appropriate material selected as a function of the contemplated use, such as metals, polymers, and/or composites, etc. The tube 20 is connected at opposed ends to components of the fluid-conveying system, for instance of a gas turbine engine and/or to other tubes, such as the tube B as shown in FIG. 1. One of the ends of the tube 20 may be a threaded connector end 22 by which the tube 20 will be threadingly engaged to a component. The opposite end is illustrated as being a tapped connector end 23. The tapped connector end 23 is configured to be coupled to the tube B as in FIG. 1, by way of coupler C. Although the embodiment of FIG. 3 shows a threaded connector end 22 and a tapped connector end 23, both ends may be threaded or tapped. Likewise, other connector configurations could be used as well, such as quick coupling, barb, etc, in any appropriate combination.

Still referring to FIG. 3, the tube 20 has an interface 25. The interface 25 has a generally cylindrical configuration, although it is not circular peripherally, but rather has a plurality of longitudinal flats 26. The flats 26 are paired into a plurality of axial channels peripherally distributed over the outer surface of the interface 25. All axial channels in the illustrated embodiment are shaped as troughs formed by the pairs of flats 26 may generally be of a same dimension and spaced apart uniformly along the outer surface of the interface 25. This trough configuration of the interface 25 is one of numerous configurations considered (splines, etc), with FIGS. 1 and 2 showing for example interface 25' having an hexagonal shape with six flats 26' in lieu of axial channels. The flats 26 and 26' may be any concavity in the outer surface of the interface 25 forming surfaces complementary to that of the blocking ring 30, as described below.

A flange 27 is positioned along the tube 20 and is adjacent to the interface 25. The flange 27 may be integral with the tube 20, or releasably connected to the tube 20. A groove 28 is carved into the outer surface of the interface 25. The flange 27 and the groove 28 may lie in parallel planes, with a longitudinal axis of the tube 20 being normal to these parallel planes.

Figure 4:
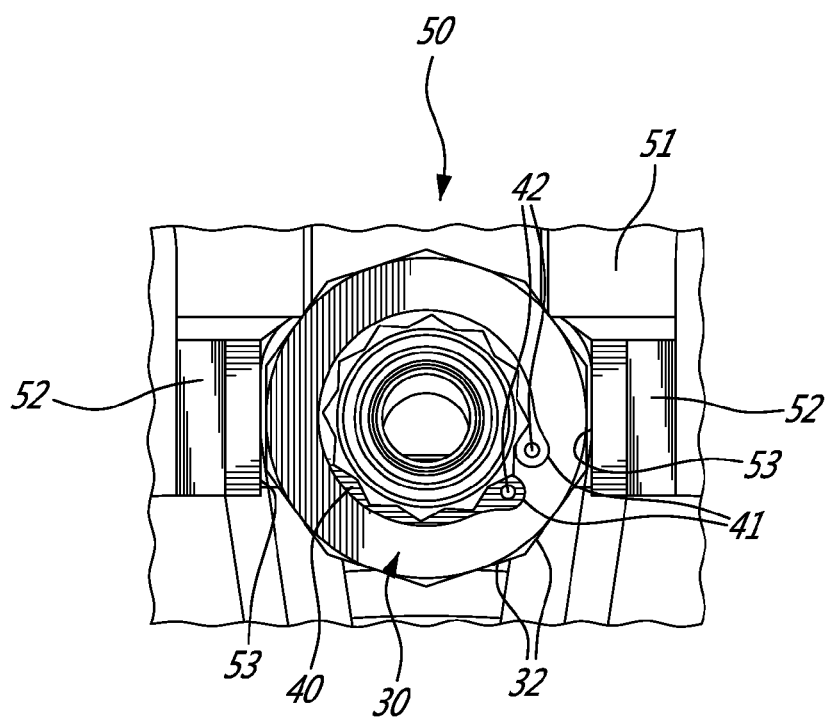
FIG. 4 is a plan view of the assembly of FIG. 1.

Referring to FIGS. 4, 5 and 6, the blocking ring 30 is shown in greater detail. The blocking ring 30 has a plurality of inner flats 31. The inner flats 31 are paired to define axial channels, which axial channels are compatible in terms of dimensions with the shape of the interface 25 of the tube 20. Accordingly, in the manner shown in FIGS. 6 and 7, the blocking ring 30 may be slid onto the interface 25, with sliding engagement between the inner surface of the blocking ring 30 and the interface 25, in such a way that the blocking ring 30 is prevented from rotating about the interface 25 when engaged to the tube 20. The inner flats 31 form surfaces complementary to that of that interface 25, whereby the blocking ring 30 is fixed in rotation to the interface 25 when coupled.

In the illustrated embodiment, the troughs-like axial channels formed with the inner flats 31 of the blocking ring 30 double the amount of troughs formed by the flats 26 of the interface 25. Accordingly, some form of orientation indexing joint is defined therebetween, to select the orientation of the blocking ring 30 on the interface 25. By having a relative higher number of complementary surfaces in at least one of the interface 25 and the blocking ring 30, numerous indexing orientations may be possible to achieve a desired orientation for the blocking ring 30. In the illustrated embodiment, the blocking ring 30 is shown having twenty-four axial channels formed with the inner flats 31, for twelve axial channels of flats 26.

Referring to FIGS. 4, 5 and 6, the blocking ring 30 is shown having outer flats 32 on its outer surface. The outer flats 32 give a decagonal shape to the blocking ring 30. This is one of the numerous configurations considered—for instance other regular convex polygons are well suited sectional shapes for the outer surface of the blocking ring 30. In the illustrated embodiments, the outer flats 32 are substantially flat. The outer surface of the blocking ring 30 (i.e., by way of the outer flats 32) forms a first joint portion, by which the blocking ring 30 will form a joint with the base 50, as detailed below.

Figure 7:
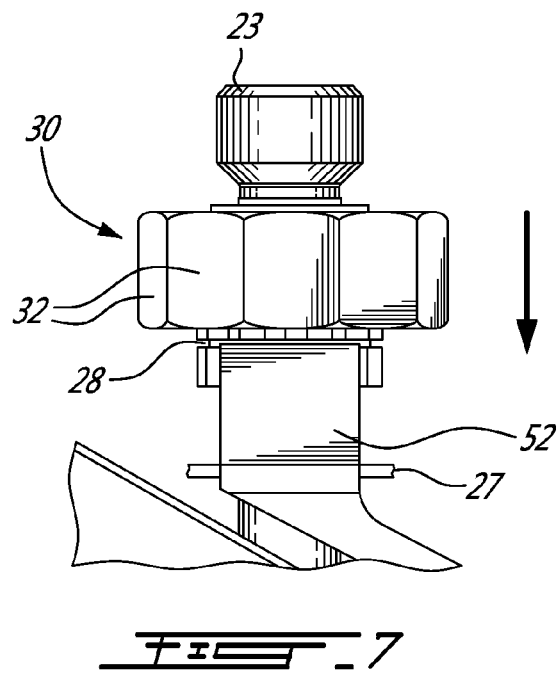
FIG. 7 is an elevation view of the blocking ring on an interface of the tube further to FIG. 6.

The blocking ring 30 has a height 33 shown in FIG. 7. The height 33 generally corresponds to the space between the flange 27 and the groove 28 in the tube 20. Accordingly, when the retaining ring 40 is installed on the interface 25 and is held captive in the groove 28, the blocking ring 30 may be held captive between the retaining ring 40 and the flange 27. It is pointed out that that the tube 20 may have a groove and retaining ring instead of the flange 27. Moreover, other configurations are considered to hold the blocking ring 30 in an axial position along the tube 20. For instance, there may be some interference or friction fit between the interface 25 and the blocking ring 30, to hold the blocking ring 30 in the selected axial position.

The retaining ring 40 is also known as an axially installed retaining ring, or an external circlip. Therefore, in conventional fashion, the retaining ring 40 has a pair of lugs 41 with holes 42 adjacent to a gap between ends of the retaining ring 40. Pliers may be used to space apart the ends of the retaining ring 40 to elastically deform the retaining ring 40 when positioning same into the groove 28 of the tube 20, or when removing the retaining ring 40.

Referring to FIGS. 1, 2 and 4, the base 50 is shown having a base plate 51. The base plate 51 is illustrated as being a generally flat plate with holes by which the base 50 may be connected to a flange of casing A as in FIG. 1. Other configurations are considered as well, as long as the base 50 may be connected securely to structural parts. The shape of the base 50 may be dictated by the structure to which it will be connected. Arms 52 form a second joint portion and project from the base plate 51 and have abutment surfaces 53 separated by a gap 54. The abutment surfaces 53 may be substantially flat, as in the illustrated embodiment.

Now that the various components of the movement-constraining assembly 10 have been described, an installation and functionality thereof will be described. Referring to FIG. 5, the tube 20 has been previously connected to a component and the base 50 has been secured to a structure. It is observed that the dimension of the tube 20 and of the base 50 is selected in such a way that the interface 25 is generally between the abutment surfaces 53 of the base 50. As shown in FIG. 5, the blocking ring 30 is positioned adjacent to the interface 25, but axially offset therefrom.

Figure 8:
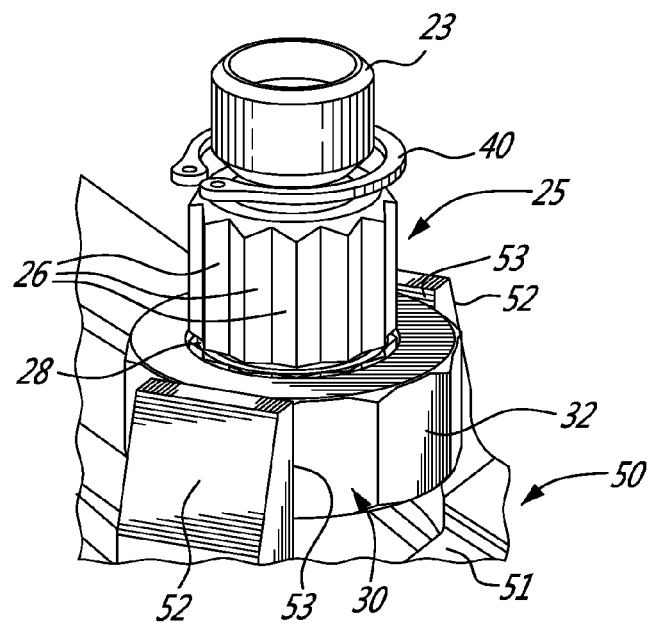
FIG. 8 is a perspective view of a retaining clip being installed on the interface further to FIG. 7.
Figure 9:
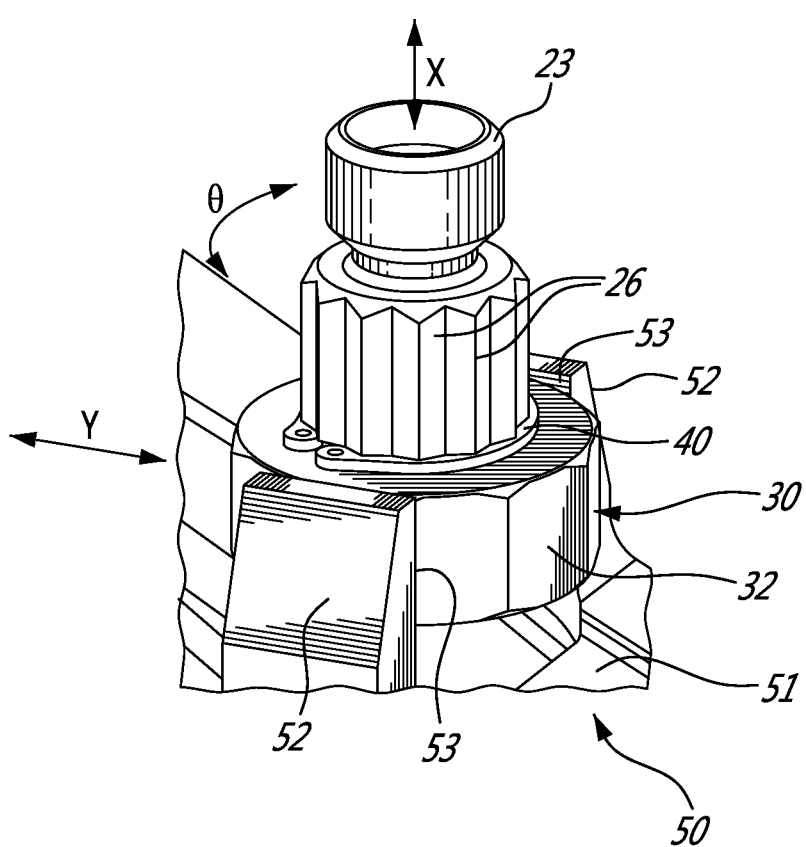
FIG. 9 is a perspective view of the assembly as assembled further to FIG. 8.

Referring to FIG. 6, an orientation of the blocking ring 30 relative to the interface 25 is adjusted, by a rotation of the blocking ring 30 about its axis. Once a suitable orientation has been reached, the blocking ring 30 may be slid onto the interface 25 in the manner shown in FIG. 7, whereby the ring 30 is blocked from rotating about the tube 20. It is desired that the outer flats 32 (a.k.a. first joint portion) be generally parallel to the abutment surfaces 53 of the arms 52 (a.k.a. second joint portion) in such a way that the outer flats 32 slide against the abutment surfaces 53 of the base 50, thereby forming a movement-constraining joint between the blocking ring 30 and the base 50, as shown in FIG. 8. It is observed that, by way of the cooperation between the abutment surfaces 53 of the base 50 and the outer flats 32 of the blocking ring 30, the blocking ring 30 and thus the tube 20 are prevented from rotating about the longitudinal axis of the tube 20. However, some play is allowed in the axial direction (for instance, as a result of thermal expansion) or in a radial direction (for instance, as a result of rattling in the environment of the movement-constraining assembly 10). Hence, the joint formed between the blocking ring 30 and the base 50 blocks an axial rotational degree of freedom and allows at least one radial rotational degree of freedom of the tube 20 (shown as $\theta$). The joint also allows at least one axial translational degree of freedom of the tube relative to the structure (shown as X), and likely another translational degree of freedom (shown as Y). The retaining ring 40 may then be installed in the groove 28 so as to hold the blocking ring 30 captive. Once the arrangement is reached, as in FIG. 9, it is possible to couple the open end of the tube 20, i.e. the tapped connector end 23 in FIG. 9, to a component of the fluid-conveying system. In some circumstances, the connection of the tube 20 via connector end 23 may be performed prior to the formation of the joint between the blocking ring 30 and base 50.

If the tube 20 must be attended to, the retaining ring 40 may be removed, to then slide the blocking ring 30 away from engagement with the base 50, to undo the joint therebetween.

The invention claimed is:

1. A movement-constraining assembly for a fluid-conveying system, comprising:
 a fluid-conveying tube defining an inner passage for fluid to pass therethrough, the tube adapted to be connected to components of the fluid-conveying system at opposed ends thereof;
 a single blocking ring having an inner surface and an outer surface surrounding the inner surface, the blocking ring mounted to the tube with complementary surfaces between the tube and the inner surface of the blocking ring to block rotation between the tube and the blocking ring, the outer surface of the blocking ring having a first joint portion; and
 a base adapted to be secured to a structure, and having a second joint portion operatively joined to the first joint portion of the blocking ring to form a joint blocking at least an axial rotational degree of freedom of the fluid-conveying tube and allowing at least one translational degree of freedom of the tube relative to the structure.

2. The movement-constraining assembly according to claim 1, wherein the fluid-conveying tube has an interface integrally formed thereon, a plurality of axial channels defined on an outer surface of the interface to form the complementary surfaces of the fluid-conveying tube.

3. The movement-constraining assembly according to claim 2, wherein the fluid-conveying tube has a flange integrally formed thereon, the flange blocking movement of the blocking ring along the fluid-conveying tube to maintain the blocking ring engaged to the interface.

4. The movement-constraining assembly according to claim 2, further comprising a retaining ring, and wherein the fluid-conveying tube has a circumferential groove formed in the interface for receiving the retaining ring, the retaining ring blocking movement of the blocking ring along the fluid-conveying tube to maintain the blocking ring engaged to the interface.

5. The movement-constraining assembly according to claim 4, wherein the retaining ring is an external circlip.

6. The movement-constraining assembly according to claim 1, wherein the complementary surfaces between the tube and the blocking ring form an indexing joint.

7. The movement-constraining assembly according to claim 1, wherein the inner surface of the blocking ring has a plurality of axial channels defined therein to form the complementary surfaces of the fluid-conveying tube.

8. The movement-constraining assembly according to claim 1, wherein the first joint portion of the blocking ring comprises sliding surface portions on the outer surface of the blocking ring.

9. The movement-constraining assembly according to claim 8, wherein the sliding surface portions are parallel opposite surfaces on the outer surface of the blocking ring.

10. The movement-constraining assembly according to claim 9, wherein the outer surface has a regular convex polygonal sectional shape including the parallel opposite surfaces.

11. The movement-constraining assembly according to claim 8, wherein the second joint portion of the base comprises a pair of abutment surfaces in sliding engagement with the sliding surface portions to form said joint.

12. The movement-constraining assembly according to claim 1, wherein at least one end of the fluid-conveying tube has threads for screwing engagement with the component of the fluid-conveying system.

13. The movement-constraining assembly according to claim 1, wherein the fluid-conveying tube is configured to be connected to a tube of the fluid-conveying system movable relative to the structure.

14. A method for constraining movement of a fluid-conveying tube of a fluid conveying-system comprising:
 connecting the fluid-conveying tube at a first end to a component of a fluid-conveying system;
 securing a base having a joint portion to a structure adjacent to the fluid-conveying tube as connected to said component;
 installing a single blocking ring on the fluid-conveying tube by engaging an inner surface of the single blocking ring on a complementary outer surface of the fluid-conveying tube to block rotation between the tube and the blocking ring, the blocking ring having the inner surface and an outer surface surrounding the inner surface, a joint portion being formed on the outer surface of the single blocking ring; and
 operatively joining the joint portion of the base and the joint portion on the outer surface of the blocking ring to form a blocking at least an axial rotational degree of freedom of the fluid-conveying tube and allowing at least one translational degree of freedom of the tube relative to the structure.

15. The method according to claim 14, wherein connecting the fluid-conveying tube comprises screwing the fluid-conveying tube to the component.

16. The method according to claim 14, wherein installing the blocking ring comprises adjusting an orientation of the blocking ring relative to the fluid-conveying tube and sliding the blocking ring onto the fluid-conveying tube to engage the complementary surfaces.

17. The method according to claim 14, wherein installing the blocking ring comprises positioning at least one retainer clip onto the fluid-conveying tube to block the blocking ring at an axial position along the fluid-conveying tube.

18. The method according to claim 14, wherein operatively joining the joint portions comprises forming a sliding joint when installing the blocking ring on the fluid-conveying tube.

19. The method according to claim 14, wherein connecting the fluid-conveying tube at a first end to a component of a fluid-conveying system comprises connecting the fluid-conveying tube to a tube of the fluid-conveying system movable relative to the structure.

* * * * *